United States Patent [19]
Salvador et al.

[11] 3,751,145
[45] Aug. 7, 1973

[54] PHOTOGRAPHIC SYSTEM EMPLOYING AN IMPROVED FILM HANDLING CASSETTE AND CASSETTE-RECEIVING APPARATUS

[75] Inventors: Henry J. Salvador, Hasbrouck, N.J.; James M. Conner, Mamaroneck, N.Y.

[73] Assignee: Polaroid Corporation, Cambridge, Mass.

[22] Filed: Dec. 13, 1971

[21] Appl. No.: 207,257

[52] U.S. Cl. .......................... 352/72, 352/78, 95/31, 95/34
[51] Int. Cl. .......................................... G03b 23/02
[58] Field of Search ................... 95/31, 34; 352/78, 352/72

[56] References Cited
UNITED STATES PATENTS
3,490,350  1/1970  Hardies............................ 352/78 X

*Primary Examiner*—John M. Horan
*Attorney*—Charles Mikulka et al.

[57] ABSTRACT

A photographic system including a motion picture film handling cassette and apparatus having a slot-like opening configured to slidably receive the cassette when it is arranged in a given predetermined orientation thereto. The cassette comprises a flat housing having a pair of opposed planar faces, with a rib-like protuberance extending across one of the faces near its trailing edge so as to prevent insertion of this edge in the slot, and at least one tactile discontinuity extending along one of the cassette faces to its leading edge which discontinuity is adapted to mate with a complementary discontinuity in one edge of the opening so as to guide the cassette into its operative location in the apparatus and in cooperation with the top rib prevents loading of the cassette except when it is oriented in one spacial relation to the apparatus. Additionally, the top rib is extended around the perimeter of the cassette to permit grasping of the cassette edge for removal from the apparatus and to provide a light baffle when the cassette is in its operative location.

24 Claims, 1 Drawing Figure

PATENTED AUG 7 1973
3,751,145
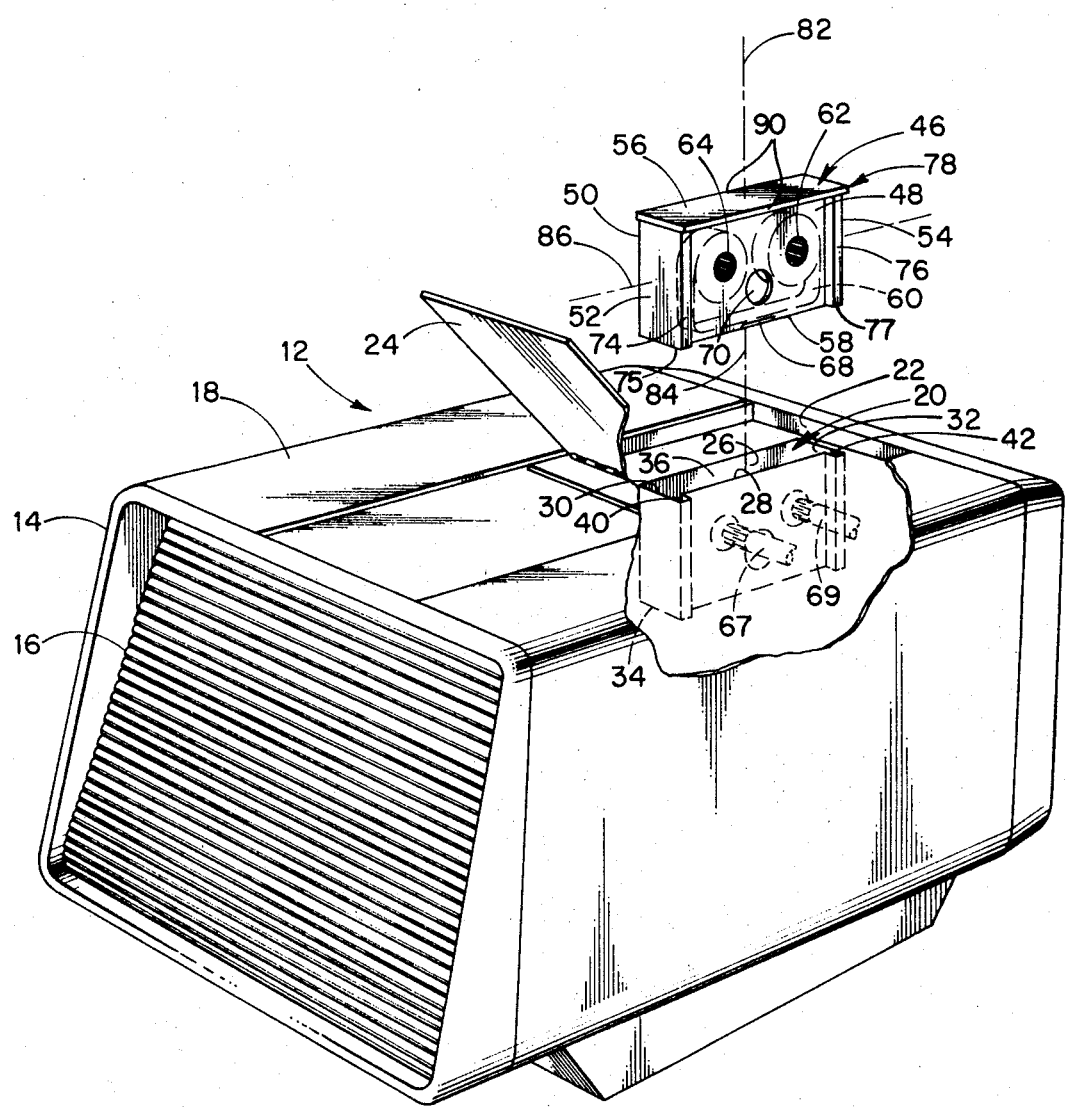

PHOTOGRAPHIC SYSTEM EMPLOYING AN IMPROVED FILM HANDLING CASSETTE AND CASSETTE-RECEIVING APPARATUS

BACKGROUND OF THE INVENTION

1. Field of the Invention

This invention relates to photography and more particularly to an improved photographic system including a film cassette and apparatus for use with the same which requires operative engagement with the cassette in a predetermined manner.

2. Prior Art

In the photographic arts, and particularly in the motion picture systems with which the invention is particularly concerned, continuing improvements have been made in recent years to provide simplified systems which are more easily operated, and hence, more suitable for the amateur. For example, apparatus are now available which are adapted to accept a motion picture cassette so as to minimize the operator's handling of the film. This arrangement while greatly simplifying the demands placed upon the operator, still requires that the cassette be properly interfaced with the apparatus. Hence, while the system minimizes actual handling of the film, it still requires a proper loading arrangement of the film unit. However, presently available systems often fail to provide a simple, economical cassette structure and apparatus which adequately precludes improper cassette loading.

Presently available cassettes additionally fail to provide suitable means for grasping the latter for removal from the apparatus. Further, in cassette systems of the type in which the film is exposed, developed and projected without removal from the cassette it is generally necessary to provide a light-tight environment during processing operations, and hence, it is desirable that the cassette structure cooperate with its operative apparatus to exclude suitably ambient light.

Consequently, a primary object of the invention is to provide an improved photographic system which precludes improper interfacing between the cassette element and the apparatus.

Another important object of this invention is to provide an improved film handling cassette and apparatus adapted for efficient loading of the cassette in the apparatus.

A further object of this invention is to provide an improved film handling cassette including an economical structural arrangement which prevents improper insertion of the cassette in its apparatus and which guides the cassette to its operative location within the apparatus during proper insertion thereof.

A still further object of this invention is to provide an improved film handling cassette which cooperates with its operative apparatus to provide a light-tight environment during processing operations.

SUMMARY OF THE INVENTION

The system of the invention, which in its illustrated embodiment is particularly adapted for motion picture photography, comprises a motion picture film cassette and photographic apparatus configured for its operation. The apparatus includes a cassette-receiving means which is configured to conform to the cassette and which includes at least one tactile discontinuity providing guide means adapted to mate with a corresponding tactile discontinuity of the cassette for guiding the latter to its operative location in the apparatus. The tactile discontinuities of both are arranged so that the receiving means will permit insertion of one end of the cassette in the receiving means when it is oriented in a predetermined manner, and the cassette additionally includes mean adjoining its opposing end for preventing insertion of that end such that in conjunction with its discontinuities permits loading of the cassette only when it is oriented in one given spacial relation to the apparatus.

In the illustrated embodiment the cassette is a parallelepiped structure having one flange-like edge and a pair of spaced apart ribs extending lateral to the flange along one of the planar sides of the unit and terminating at the cassette edge opposite the flange. The apparatus is a projector unit which includes a cassette-receiving slot having an open end configured to conform to the indicated opposite edge of the cassette. Included in a side wall of the slot are a pair of spaced apart recesses which are configured to guidingly receive the spaced apart ribs of the cassette. Hence, the cassette ribs prevent insertion of this edge of the cassette if the latter is rotated so that the ribs are out of alignment with the recesses, and the slot width prevents insertion of the flanged portion of the cassette such that the latter cannot be inverted for insertion. Hence, the cassette must be arranged in a predetermined orientation with respect to the receiving means for proper insertion therein. Additionally, the cassette flange operates as a light baffle to prevent light rays from entering the projector through the opening when the cassette is in its operating position.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawing wherein the illustrated FIGURE is a diagrammatic view in perspective of a motion picture film handling cassette and a projector apparatus constructed in accordance with the invention.

DESCRIPTION OF THE PREFERRED EMBODIMENT

The system of the invention may be employed with a motion picture system of the type described in the commonly assigned, copending patent application Ser. No. 755,901 of Edwin H. Land filed on Aug. 28, 1968, now U.S. Pat. No. 3,615,127, which describes a simplified motion picture system in which the several operations of exposure, chemical processing, drying and projection of the recorded images is accomplished without transferring the film from its cassette. In this system, the motion picture film which is stored within a multipurpose cassette is first exposed in a camera to record scene images thereon. The cassette is then loaded into a special purpose projector which first subjects the film strip to a processing treatment and thereafter drys the film strip and projects the recorded images thereon for viewing by the audience.

In the illustrated embodiment of this invention, which may be best understood by referring to the drawing, a multipurpose film cassette 10, similar to the above-noted type is employed. The cassette 10, which may take the form of that described in the commonly assigned, copending patent application Ser. No. 813,469 of Rogers B. Downey filed on Apr. 4, 1969, now U.S. Pat. No. 3,608,455, is illustrated in conjunction with a projector apparatus 12 such as, for example, described in the commonly assigned, copending patent application Ser. No. 174,343 of Philip G. Baker et al filed on Aug. 24, 1971.

The projector 12 is illustrated as a rear projection viewer comprising a box-like housing 14 defined in part by a front viewing screen 16. Positioned rearwardly of the screen 16 in an adjoining relation to the top surface 18 of housing 12 is a cassette-receiving slot or well 20 which extends to and is in communication with a shallow depression 22 of the top surface 18. The well 20 is made up of side walls 26 and 28, end walls 30 and 32 and a bottom wall 34 which together form a box-like, open ended slot 20 in communication with depression 22 through the open top 36 of the well. Running along side wall 28 to the bottom of the well 20 are a pair of indents or recesses 40 and 42 which form tactile discontinuities in the well opening 36 for preventing improper insertion of and for guiding the cassette 10 to its proper location within the viewer as later explained in detail. Finally, access to the well 20 is controlled by a door member 24 which is pivotally mounted at the forward edge of the depression 22.

It should be understood that the term "projector" is used herein in a comprehensive sense, i.e., to broadly refer to systems wherein the visible image recorded on a sheet of material is reimaged for viewing purposes and is not restricted to rear projection viewer systems in which the recorded visible image is projected within a compact housing onto the rear of a front viewing screen.

The cassette 10, which as previously indicated is a multipurpose motion picture film cassette, comprises a generally parallelepiped casing or housing 46 of molded plastic, for example, made up of planar faces or side walls 48 and 50, end walls 52 and 54 and elongated top and bottom edges 56 and 58. Carried within the housing 46 is a photographic film strip 60 which is initially (in its photosensitive state) mostly coiled on and permanently attached at one of its ends (not shown) to a rotatably supply spool or reel 62 from which it extends within the casing 46 in a somewhat extended path to a take-up spool or reel 64 to which the opposite end of the film is attached.

In its path within the casing 46, the film 60 extends across an opening 68 of the bottom edge 58 of the casing. This opening 68 functions at different times to facilitate both exposure and projection. Hence, in accordance with the forementioned, copending patent applications the opening 68 serves to provide the cassette 10 with a film exposure station where progressive incremental sections of the film strip 60 may be exposed to image-carrying light rays when the cassette is mounted in an appropriate camera (not shown), and a film projection station where light rays form a projection illumination system (not shown) may be directed through progressive incremental sections of the film strip when the cassette is mounted in the projector 12. For the projection operation, a prism (not shown) may be mounted behind the film strip 60 in an adjoining relation to both the opening 68 and an illumination aperture 70 of face 48 so as to facilitate film illumination during this operation.

Additionally, the cassette 10 also includes a normally inoperative film processing station (not shown) comprising an applicator (not shown) which may be selectively rendered operable for processing of the film strip 60 to a viewable condition prior to projection. Consequently, following exposure of the film strip 60, when approximately its entire length will then have been unwound from the supply spool 62 and coiled onto the take-up spool 64, the cassette 10 is positioned within the projector apparatus 12 for processing of the film strip and subsequent projection of the recorded images. Processing is accomplished, as explained in the aforementioned application of Rogers B. Downey, by dispensing a processing fluid (not shown) on the film strip 60 during the time that the film is initially being rewound onto the supply spool 62.

For these processing and projection operations the cassette 10 is arranged within the well 20 with its projection station opening 68 in a lowermost position. In this location, the cassette 20 is oriented for suitable processing during rewind of the film 60 and positioned for operative engagement with various projection means of the apparatus as subsequently described.

Hence, the opening 68 is in registration with an aperture plate (not shown) of the bottom 34 of the well, and the illumination aperture 70 is located in alignment with a conventional projection lamp (not shown) which is configured to direct illumination onto the cassette to, and then outwardly through, incremental segments of the film 60 as they are progressively advanced across opening 68. For driving the film spools 62 and 64, a pair of drive spindles 67 and 69 are mounted alongside the well 20 for displacement into engagement with the respective film spools once the cassette 10 is properly located in the apparatus. Mounted beneath the cassette-receiving well 20 are conventional projector components (not shown) such as a claw mechanism, a suitable rotary shutter, and a projection lens assembly. The latter being configured to transmit the image bearing illumination emanating from the opening 68 and focus it in the plane of transparent screen 16.

Consequently, proper loading of the cassette 10 in the viewer 12 requires that they be respectively oriented as shown in the drawing. In accordance with the invention, insertion in any other orientation is prevented by rib-like portions 74, 76 and 78 which form tactile discontinuities of the cassette housing 46. In the economical structure of this embodiment, the end walls 52 and 54 extend slightly beyond the planar surface 48 of the cassette housing 46 and in effect provide spaced parallel, guide ribs 74 and 76 which protrude outwardly from the side as shown. Additionally, the top edge 56 of the cassette extends beyond all the adjoining cassette surfaces and in effect provides a flange-like top having a narrow peripheral rib 78 disposed coplanar with the top and orthogonal to the longitudinal axis (not shown) of ribs 74 and 76. This peripheral rib 78 provides means for extending the housing exteriorly of its side walls and faces and prevents insertion of this end of the cassette 10 in the opening 36.

For insertion within the projector 12, the cassette 10 is oriented over the cassette-receiving well 20 as shown in the drawing with its guide ribs 74 and 76 aligned with the indents 40 and 42. The cassette 10 is then moved downwardly so as to insert the lower cassette edge 58 into the well 20 with ribs 74 and 76 in engagement with the respective indents 40 and 42. The downward movement of the cassette 10 is continued until it bottoms in the well 20 at which point, as previously indicated, its projection station opening 68 will be in proper location for cooperation with the image projecting means (not shown) etc. of the apparatus 12. In this loading arrangement, the indents 40 and 42 additionally provide means for guiding the cassette 10 to its operative location.

Advantageously, the side ribs 74 and 76 and the indents 40 and 42 make the cassette housing and the receiving well non-symmetrical around their lateral bisecting axes 82 and 84, respectively, and in cooperation with each other prevent insertion of the cassette if it is rotated around its axis 82 from the position shown. That is, these ribs and indents insure that face 48 and wall 28 will be in adjoining relation for cassette loading. Additionally, the flange-like top edge 46 and more particularly its peripheral rib 78 increase the cross-section of the cassette and make it non-symmetrical around its longitudinal bisecting axis 86. Hence, this prevents insertion of the cassette if it is rotated around this latter axis from the position shown. Consequently, this insures that edge 58 will be the leading edge and edge 56 the trailing edge of the cassette 10 during loading operations.

It should be understood that either of the side ribs 74 or 76 in conjunction with the top peripheral rib 78, which, in effect, terminates the side ribs, efficiently provide an asymmetry to the cassette housing 46 which permits insertion of the cassette only when it is oriented in the attitude shown. Stated otherwise, the well 20 presents an opening 36 which conforms to and will accept the bottom edge 58 of the cassette including the ends 75 and 77 of its rib elements 74 and 76 but will not accept its top edge 56 since the well sides 26 and 28 are spaced a distance slightly exceeding the width of the cassette as measured across faces 48 and 50 but less than the overall width of the flange like top 56.

To prevent complete insertion of the cassette top 56, the latter need only provide a protuberance disposed on either of the side walls 48 or 50 and in an arrangement transverse to the elongated side ribs 74 and 76 since even a short protuberance of either side walls transverse to these side ribs will prevent entry of at least a portion of this end of the cassette in the well 20. However, the top edge 56 is extended beyond at least one and preferably both planar faces 48 and 50 to provide a pair of elongated ribs 90 which extend from end wall 52 to end wall 54 across the full face of the cassette and thereby essentially preclude insertion of any portion of the top surface 56 in the well 20. These elongated ribs 90 also more adequately identify this edge 56 as the trailing edge of the cassette 10 for insertion and discourages the operator from any attempt to load the cassette in an attitude in which any portion of this edge 56 must enter the well 20. Further, this arrangement additionally permits easier grasping of the unit for removal from the well 20 inasmuch as it provides a ridge running perpendicular to the normal position of the operator's fingers during withdrawal of the cassette 10.

Advantageously, the extension of the top 56 provides substantially a flange which in cooperation with the well 20 functions as a light baffle which tends to exclude light from entering the well. This is desirable inasmuch as the projector apparatus is also intended for film processing. To compliment this baffle function of the flange, the well opening 36 may also include a resilient sealing means (not shown) around its perimeter which is configured to engage the cassette sides and additionally preclude light rays from entering the apparatus.

Those familar with the motion picture arts will readily appreciate the novel and highly unique advantages of this invention which provides a photographic apparatus and a film handling cassette configured to permit a simplified cassette-loading arrangement. The cassette is an easily molded unit having orthogonal ribs configured for providing a multiplicity of functions including: means for preventing of improper loading of the cassette; means for guiding it to its operative location; means for facilitating its removal from the apparatus; and means for precluding light from entering the apparatus in the vicinity of the well.

It should be understood that this invention may be practiced or embodied in still other ways without departing from the spirit or essential character thereof. Hence, the preferred embodiment herein is illustrative and not restrictive, the scope of the invention being indicated by the appended claims and all variations which come within the meaning of the claims are intended to be embraced therein.

What is claimed is:

1. A photographic system comprising:
   a photographic film cassette comprising:
   a housing having a pair of substantially parallel spaced side walls joined together at their edges by one or more surfaces;
   at least one tactile discontinuity located on at least one of said side walls in adjoining relation to one end of said cassette; and
   means located on the other end of said housing opposite said one end for extending said housing exteriorly of either of said side walls; and
   an apparatus comprising:
   a housing;
   means for receiving said film cassette in operative relation with cooperating elements of said apparatus, said receiving means including a slot-like opening disposed in a surface of said housing, said opening including in one edge thereof at least one tactile discontinuity complementary to said cassette discontinuity and configured to mate therewith upon insertion of said cassette in said opening, and said opening configured to prevent insertion of said cassette extending means such that said cassette discontinuity and said cassette extending means in combination prevent insertion of said cassette in said apparatus opening except when said cassette is oriented in one given spacial relation thereto.

2. The system of claim 1 wherein said extending means includes at least one elongated protuberance extending across at least one of said side walls in adjoining relation to said other end of said housing.

3. The system of claim 1 wherein said extending means includes at least one protuberance extending exteriorly of one of said side walls at an angle thereto and in adjoining relation to said other end of said housing.

4. The system of claim 1 wherein said extending means includes a protuberance extending substantially across the length of one of said side walls forming an outwardly extending rib in adjoining relation to said other end of said housing, and said tactile discontinuity is an elongated discontinuity extending along either of said sidewalls from said vicinity of said other end of said housing to said one end thereof in a plane substantially perpendicular to the longitudinal axis of said rib.

5. The system of claim 1 wherein said extending means includes a protuberance extending across the length of each of said side walls in adjoining relation to said other end of said housing for providing a flange-like top wall of said housing at said other end.

6. The system of claim 1 wherein said extending means includes a narrow rib-like protuberance extending outwardly from and across the length of at least one of said side walls in adjoining relation to said other end, and including a pair of tactile discontinuities extending along said one side wall in parallel spaced apart relation from said protuberance to said one end of said housing.

7. A photographic system comprising:
a photographic film cassette comprising:
  a substantially parallelepiped housing formed by a pair of substantially parallel spaced planar side walls joined together by a pair of substantially parallel spaced end walls and substantially parallel spaced top and bottom walls;
  means located in adjoining relation to said top wall for extending said housing exteriorly at an angle to said side walls including edge portions of said top wall extending coplanar therewith exteriorly of said side walls and said end walls so as to form a flange-like top portion of said cassette;
  at least one tactile discontinuity located on at least one of said side walls and extending from the vicinity of said top wall to the vicinity of said bottom wall in a plane substantially perpendicular to the plane of said top wall; and
an apparatus comprising:
  a box-like housing formed by a plurality of wall surfaces including a top surface;
  means located in said top surface for receiving said film cassette in operative relation with cooperating elements of said housing, said receiving means including a slot-like opening in said top surface configured for slidably receiving said cassette only when the latter is oriented in one given spacial relation to said opening such that said bottom wall is in leading engagement therewith, said opening including in one edge thereof a tactile discontinuity complementary to said cassette discontinuity and configured to mate therewith when said cassette is oriented in said one spacial relation, and said opening being of smaller area than the area of said flange-like top portion so as to prevent insertion thereof such that said cassette discontinuity in combination with said flange-like top prevents insertion of said cassette in said opening except when said cassette is oriented in said one spacial relation, and said receiving means being configured to receive a major portion of said cassette housing when said cassette is fully inserted in said receiving means such that said cassette flange-like top is located close to said apparatus top with said extended edge portions of said cassette top wall in overlying relation to the edges of said opening so as to provide in combination therewith a light baffle arrangement for reducing the entrance of ambient light into said opening.

8. A photographic film cassette for use with photographic apparatus having a slot-like opening for slidably receiving said cassette so as to locate the latter in operative relation with cooperating elements of such apparatus and including at least one tactile discontinuity in one edge of such opening, said cassette comprising:
a housing having a pair of substantially parallel spaced side walls joined together at their edges by one or more surfaces;
at least one tactile discontinuity located on at least one of said side walls in adjoining relation to one end of said housing, said cassette discontinuity being complementary to such opening discontinuity and configured to mate therewith upon insertion of said cassette in such opening when said cassette is oriented in one given spacial relation to such opening such that said one end is in leading engagement with such opening and said cassette discontinuity is in mating engagement with such opening discontinuity; and
means located on the other end of said housing opposite said one end for extending said housing exteriorly of said side walls so as to prevent insertion of said other end in such opening, said extending means in combination with said cassette discontinuity preventing insertion of said cassette in such opening except when said cassette is oriented in said one given spacial relation thereto.

9. The cassette of claim 8 wherein said extending means includes at least one protuberance extending outwardly at an angle to the plane of at least one of said side walls and in adjoining relation to said other end of said housing.

10. The cassette of claim 8 wherein said extending means includes at least one protuberance extending outwardly at an angle to the plane of one of said side walls and across the length thereof in adjoining relation to said other end of said housing.

11. A Photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said extending means includes at least one elongated protuberance extending outwardly at an angle to the plane of one of said side walls and substantially across the length thereof in adjoining relation to said other end of said housing, and said tactile discontinuity is an elongated discontinuity extending along either of said sidewalls from said vicinity of said other end of said housing to said one end thereof in a plane substantially perpendicular to the longitudinal axis of said elongated protuberance.

12. A photographic film cassette for use with photographic apparatus having a slot-like opening for receiving said cassette in operative relation with cooperating elements of such apparatus and including at least one tactile discontinuity in one edge of such opening, said cassette comprising:
  a housing having a pair of substantially parallel spaced side walls joined together at their edges by one or more surfaces;
  at least one tactile discontinuity located on at least one of said side walls in adjoining relation to one end of said housing, said cassette discontinuity being complementary to such opening discontinuity and configured to mate therewith upon insertion of said cassette in such opening; and
  means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said extending means includes a protuberance extending across the length of each of said side walls in adjoining relation to said other end of said housing for providing a flange-like top wall of said housing at said other end.

13. A photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said extending means is a narrow rib-like protuberance extending across the length of at least one of said side walls in adjoining relation to said other end, and said one side wall including a pair of tactile discontinuities extending therealong in substantially parallel spaced relation from said protuberance to said one end of said housing.

14. A photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said side walls are joined together at said one and said other ends of said housing by opposed bottom and top wall surfaces respectively, and said extending means includes an elongated protuberance extending outwardly from at least one of said side walls and across substantially the full length thereof in substantially parallel relation to said top wall for providing gripping means at said other end of said cassette.

15. A photographic film cassette for use with photographic apparatus having a slot-like opening for receiving said cassette in operative relation with cooperating elements of such apparatus and including at least one tactile discontinuity in one edge of such opening, said cassette comprising:
  a housing having a pair of substantially parallel spaced side walls joined together at their edges by one or more surfaces;
  at least one tactile discontinuity located on at least one of said side walls in adjoining relation to one end of said housing, said cassette discontinuity being complementary to such opening discontinuity and configured to mate therewith upon insertion of said cassette in such opening; and
  means located on the other end of said housing opposite said one end for extending said housing exteriorly of said side walls so as to prevent insertion of said other end in such opening, and said extending means in combination wtih said cassette discontinuity preventing insertion of said cassette in such opening except when said cassette is oriented in one given spacial relation thereto, said extending means includes a protuberance extending across the length of each of said side walls in adjoining relation to said other end of said housing, and said protuberance of said walls being spaced from said one end of said housing such that when a major portion of said housing is inserted within such opening, said protuberances are positioned close to such opening and overlie the edges thereof so as to provide a light baffle arrangement therefor.

16. A photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said side walls are joined together at said one end and said other end of said housing respectively by opposed bottom and top wall surfaces respectively, and said extending means includes an elongated protuberance extending outwardly from at least one of said side walls and across substantially the full length thereof in adjoining relation to said top wall and substantially parallel thereto, and said cassette discontinuity includes at least one elongated discontinuity extending along said one side wall from said elongated protuberance to said bottom wall in a direction substantially perpendicular to said top wall for cooperating with such discontinuity of such opening for guiding said cassette to its operative location in such apparatus.

17. The cassette of claim 16 wherein such discontinuity of such opening is an indent, and said cassette discontinuity is a protuberance complementary to such indent.

18. A photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, such opening includes a pair of spaced discontinuities in such one edge thereof, said side walls of said housing are joined together at said one end and said other end of said housing respectively by opposed bottom and top side walls, said extending means includes an elongated rib-like protuberance located on at least one of said side walls and extending along substantially the length thereof in substantially coplanar relation to said top wall, and said one side wall including a pair of spaced parallel discontinuities extending along said one side wall in a direction substantially perpendicular to said top wall.

19. The cassette of claim 18 wherein such discontinuities of such opening are indents and said cassette discontinuities are elongated rib-like protuberances complementary to said indents.

20. A photographic film cassette for use with photographic apparatus having a slot-like opening for receiving said cassette in operative relation with cooperating elements of such apparatus and including at least one tactile discontinuity in one edge of such opening, said cassette comprising a housing having a pair of substantially parallel spaced side walls joined together at their edges by one or more surfaces, at least one tactile discontinuity located on at least one of said side walls in adjoining relation to one end of said housing, said cassette discontinuity being complementary to such opening discontinuity and configured to mate therewith upon insertion of said cassette in such opening, means located on the other end of said housing opposite said one end for extending said housing exteriorly of said side walls so as to prevent insertion of said other end in such opening, and said extending means in combination with said cassette discontinuity preventing insertion of said cassette in such opening except when said cassette is oriented in one given spacial relation thereto, said one or more surfaces of said housing includes a pair of substantially parallel spaced end walls and substantially parallel spaced top and bottom walls, said top and bottom walls being located at said other end and said one end of said housing respectively, and said extending means includes a continuous peripheral protuberance extended outwardly of said side walls and said end walls for providing a flange-like top configured to provide a light baffle for said opening when said cassette is received in operative location therein.

21. The cassette of claim 20 wherein said discontinuity includes an elongated discontinuity extending from said flange-like top to said bottom wall and configured for cooperating with such discontinuity of such opening for guiding said cassette to its operative location in such apparatus.

22. Photographic apparatus for operating a film cassette having a housing formed by a pair of substantially parallel side walls joined together at their edges by one or more surfaces, said side walls defining a given width of such cassette, at least one of said side walls including at least one tactile discontinuity located in adjoining relation to one end of such housing, and means located at the other end of such housing opposite such one end for extending such housing exteriorly of said side walls and such given cassette width, said apparatus comprising:
 a housing; and
 means for receiving such film cassette in operative relation with cooperating elements of said apparatus said receiving means including a slot-like opening disposed in a surface of said housing, said opening configured for slidably receiving such cassette only when the latter is oriented in one given spacial relation to said opening such that such one end of such cassette is in leading engagement with said opening, said opening including in one edge thereof at least one tactile discontinuity complementary to such cassette discontinuity and configured to mate therewith upon insertion of such cassette in said opening, and said opening having a width slightly exceeding such given width of such cassette and configured to prevent insertion of said cassette extending means such that said opening discontinuity and such cassette extending means in combination prevent insertion of such cassette in said apparatus opening except when such cassette is oriented in said one given spacial relation thereto.

23. Photographic apparatus for operating a film cassette having a housing formed by a pair of substantially parallel side walls joined together at their edges by one or more surfaces and including at least one tactile discontinuity located on at least one of said side walls in adjoining relation to one end of such housing and means located at the other end of such housing opposite such one end for extending such housing exteriorly of said side walls, such extending means includes at least one rib-like protuberance extending outwardly at an angle to the plane of one of said side walls and across the length thereof in adjoining relation to such one end of such cassette, said apparatus comprising:
- a housing; and
- means for receiving such film cassette in operative relation with cooperating elements of said apparatus, said receiving means including a slot-like opening disposed in a surface of said housing, said opening including in one edge thereof at least one tactile discontinuity complementary to such cassette discontinuity and configured to mate therewith upon insertion of such cassette in said opening, and said opening configured to prevent insertion of said cassette extending means such that said opening discontinuity and such cassette extending means in combination prevent insertion of such cassette in said apparatus opening except when such cassette is oriented in one given spacial relation thereto, said opening is configured to prevent entry of such rib-like protuberance.

24. Photographic apparatus for operating a film cassette having a housing formed by a pair of substantially parallel side walls joined together at their edges by one or more surfaces and including at least one tactile discontinuity located on at least one of said side walls in adjoining relation to one end of such housing and means located at the other end of such housing opposite such one end for extending such housing exteriorly of said side walls, such cassette includes a pair of opposed end walls and a bottom and top wall which respectively form such one and other ends of such housing, and such extending means is a portion of such top wall which is extended peripherally beyond such side walls and such end walls to form a flange top at such other end of such cassette, said apparatus comprising:
- a housing; and
- means for receiving such film cassette in operative relation with cooperating elements of said apparatus, said receiving means including a slot-like opening disposed in a surface of said housing, said opening including in one edge thereof at least one tactile discontinuity complementary to such cassette discontinuity and configured to mate therewith upon insertion of such cassette in said opening, and said opening configured to prevent insertion of said cassette extending means such that said opening discontinuity and such cassette extending means in combination prevent insertion of such cassette in said apparatus opening except when such cassette is oriented in one given spacial relation thereto, said opening is of smaller area than such flange top so that such flange additionally provides a light baffle arrangement when such cassette is properly inserted in said apparatus.

* * * * *